United States Patent Office 2,945,849
Patented July 19, 1960

---

2,945,849

DISAZO COMPOUNDS CONTAINING A QUATERNARY AMMONIUM GROUP

Winfried Kruckenberg, Leverkusen-Bayerwerk, and Konrad Weis, Leverkusen, Germany, assignors to Farbenfabriken Bayer Aktiengesellschaft, Leverkusen, Germany, a corporation of Germany No Drawing. Filed Mar. 3, 1958, Ser. No. 718,488

Claims priority, application Germany Mar. 4, 1957

5 Claims. (Cl. 260—185)

The present invention relates to a process and to compositions for the dyeing and printing of polymers and co-polymers of acrylonitrile; more particularly it relates to a process for dyeing and printing articles comprising acrylonitrile with polyazo dyestuffs containing at least one externally linked amino or ammonium group. The invention further relates to new polyazo dyestuffs.

In accordance with the invention it has been found that polyazo dyestuffs which are free of sulfonic acid and carboxylic acid groups and contain at least one externally linked basic primary, secondary or tertiary amino or quaternary ammonium group may advantageously be used for dyeing and printing articles comprising acrylonitrile.

As articles comprising acrylonitrile polymers there may be mentioned fibres, filaments, fabrics, moulded articles and the like. Also acrylonitrile co-polymers containing at least 85% by weight of acrylonitrile can be dyed and printed according to the invention.

It is an object of this invention to provide a process for dyeing and printing articles prepared from acrylonitrile polymers containing at least 85% by weight of acrylonitrile. A further object is the provision of dyed acrylonitrile polymers and co-polymers, the dyeings obtained being distinguished by good fastness properties.

The polyazo, especially dis- and trisazo dyestuffs to be used according to the present dyeing and printing process may belong, for example, to the benzene-azo-benzene-azo-benzene series, the benzene-azo-naphthalene-azo-benzene series, to the naphthalene-azo-benzene-azo-benzene series or the aryl-azo-aryl-azo-arylpyrazolone, aryl-azo-aryl-azo-arylacetic acid aryl- and alkylamide or to the heterocyclic series. They are obtainable by usual methods by coupling of diazotized diamines or amino-azo dyestuffs with azo components. The externally linked basic group may thereby be contained in the diazo or in the azo component. Quaternary ammonium groups may be introduced into the dyestuff molecule before or after the coupling reaction by the usual reaction of tertiary amino groups with alkylating agents.

By the term "externally linked" amino groups we understand amino groups which are not attached to an aromatic or heterocyclic nucleus but are attached to a terminal (external) radical of the dyestuff molecules.

It is also possible to use dyestuffs containing more than one externally linked basic amino group in the molecule. On the other hand, two dyestuffs may also contain a common, preferably quaternary, external basic group. In this way there are obtainable for example dyestuff mixtures of uniform affinity whereby at least one of the both components must be an azo dyestuff. In addition to these groups, the dyestuffs may also contain other substituents usual in azo chemistry, with the exception of sulfonic acid and carboxylic acid groups.

The monoazo dyestuffs having an externally linked primary, secondary or tertiary amino group used according to the present process are readily soluble in water in the form of their salts or as quaternary ammonium bases. The majority show a good affinity on polyacrylonitrile fibers, even if the corresponding dyestuffs without the primary, secondary or tertiary amino group or quaternary ammonium group do not or only slightly draw on to the fibre.

The dyestuffs are dyed or printed onto the polyacrylonitrile fibre in usual manner, for example from an acid solution. The dyeings or prints thus obtained distinguish themselves by good fastness properties.

The following examples are given for the purpose of illustrating the invention, without, however, limiting it thereto.

Example 1

14.3 parts by weight of 2,4-dicyano-1-amino-benzene are dissolved and diazotized below 20° C. in 120 parts by weight of nitrosyl-sulfuric acid corresponding to a content of 7 g. of sodium nitrite. The diazo salt solution thus obtained is poured on ice and the clear solution combined with an aqueous solution of 30 parts by weight of the coupling component corresponding to the following formula

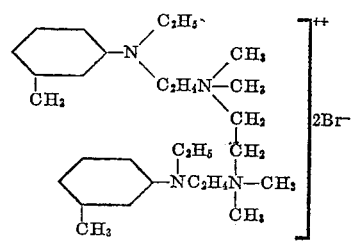

After the addition soda lye at 0° C. the solution is brought to a pH value of 3.5 and the precipitated dyestuff filtered with suction and dried. It dyes polyacrylonitrile fibre in fast yellowish red shades.

Example 2

In a dyebath containing 1 percent calculated on the weight of the fibre of the dyestuff of the following formula:

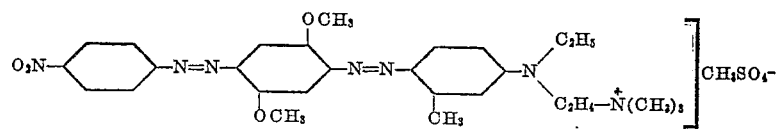

obtained by coupling 1 mol of diazotized 1-amino-4-nitrobenzene with 1 mol of 1-amino-2,5-dimethoxybenzene, diazotizing and further coupling with 1 mol of the methyl-sulfate of 1-methyl-3-N-ethyl-N-β-trimethyl-ammonium-ethyl-aminobenzene, 5 g. of polyacrylonitrile fibre are dyed without any further addition using a liquor-to-goods ratio of 40:1. The material is introduced at 40–50° C., the bath is brought to the boil within 20–30 minutes and the material boiled for 1 hour. The material is then rinsed and dried. A currant shade is thus obtained of good fastness to wetting, particularly good fastness to subliming and ironing, and very good fastness to light.

Example 3

In a dyebath containing 1 percent of a dyestuff of the following composition:

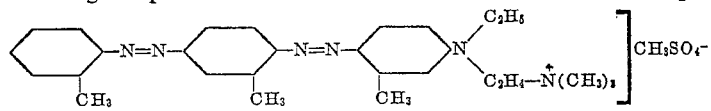

calculated on the weight of the fibre, 3 g. of polyacrylonitrile fibre are dyed with the addition of 3 percent of acetic acid (referred to the weight of the dyeing material) using a liquor-to-goods ratio of 40:1. The material is introduced at 40–50° C., the bath brought to the boil within 20–30 minutes and the material boiled for one hour. It is then rinsed and dried. An orange shade is thus obtained.

Instead of acetic acid there can also be used formic acid, sulfuric acid, hydrohalic acid, phosphoric acid etc. Polymers of acrylonitrile containing 1 to 10% of acrylic acid methyl ester or methacrylic acid methyl ester or vinyl chloride or as.-dicyan-ethylene can be dyed in the same manner whereby similar shades having good fastness properties are obtained.

Example 4

In a dyebath containing 1 percent of a dyestuff of the following composition:

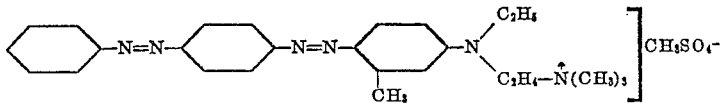

calculated on the weight of the fibre, 5 g. of polyacrylonitrile fibre are dyed with the addition of 2 percent of sodium carbonate (referred to the weight of the dyeing material) using a liquor-to-goods ratio of 40:1. The material is introduced at 40–50° C., the bath brought to the boil within 20–30 minutes and the material boiled for one hour. It is then rinsed and dried. An orange shade is thus obtained.

Valuable dyeings on polyarcylonitrile fibres are also obtained with the dyestuffs listed in the following table:

| Dyestuff | Shade of dyeing or print on polyacrylonitrile fibres |
|---|---|
| | reddish bordo. |
| | currant. |
| | reddish bordo. |
| | yellowish red. |
| | yellowish brown. |
| | dark grey. |
| | grey. |
| | yellowish brown. |

| Dyestuff | Shade of dyeing or print on polyacrylonitrile fibres |
|---|---|
| 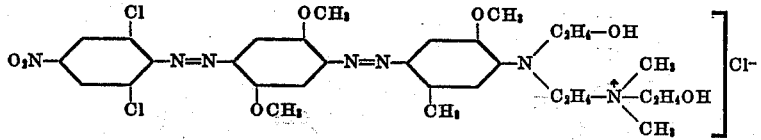 | reddish violet. |
| 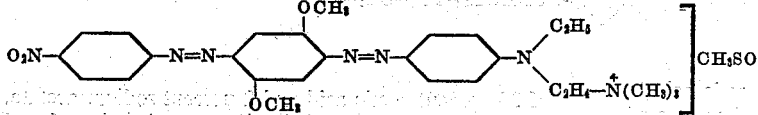 | Do. |
| 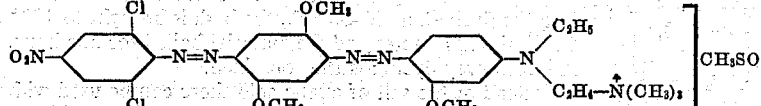 | violet. |
| 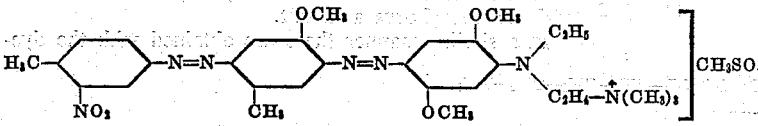 | bordo. |
| 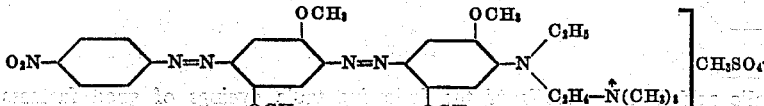 | yellowish dark brown. |
| 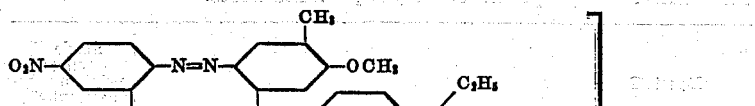 | bluish brick red. |
| 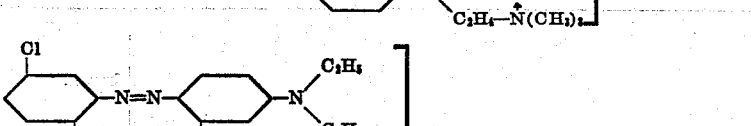 | yellowish orange. |
| 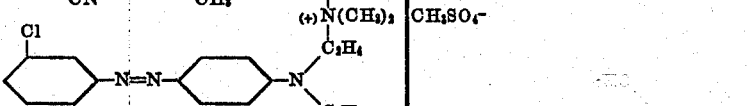 | reddish bordo. |
| 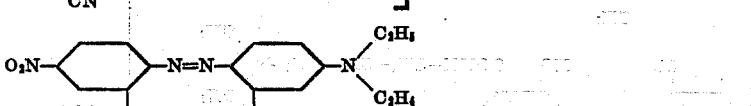 | orange. |

Example 5

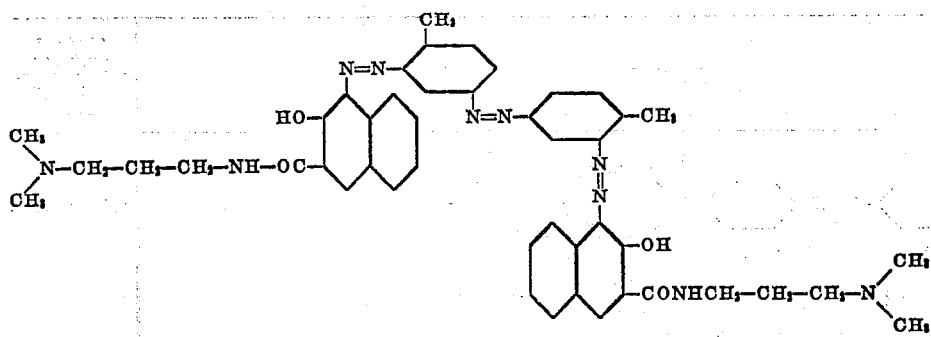

is dissolved in the form of the salt of chloracetic acid in 3 litres of water to give a clear solution and then treated with 3 g. of 30 percent acetic acid. 100 grams of polyacrylonitrile fibre are then introduced into the dyebath at 40–50° C., the bath is brought to 100° C. within 40 minutes and the material boiled for one hour. A bordo-red dyeing is thus obtained.

Example 6

1 gram of the dyestuff of the formula:

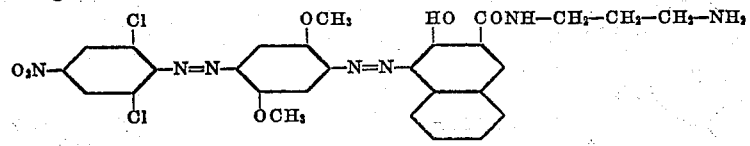

is dissolved in the form of the salt of oxalic acid in 3 litres of water to give a clear solution and treated with 3 g. of 30 percent acetic acid and 2 percent sodium acetate. 100 grams of polyacrylonitrile fibre are then introduced into the dyebath at 40–50° C., the bath is brought to 100° C. within 40 minutes and the material boiled for one hour. A bluish grey dyeing is thus obtained.

Instead of the salt of oxalic acid there can be used with similar result the sulfuric acid salt, a hydrohalic acid salt and the phosphorus acid salt.

In a similar manner there are obtained with the dyestuffs of the following table dyeings of good fastness properties on polyacrylonitrile fibres.

| Dyestuff | Shade of dyeing or print on polyacrylonitrile fibres |
|---|---|
| | brown. |
| | bluish bordo. |
| | brown. |
| | bordo. |
| | reddish grey. |

| Dyestuff | Shade of dyeing or print on polyacrylonitrile fibres |
|---|---|
| (CH₃)₂N-C₆H₃(CH₂)-NH-OC-[naphthol]-N=N-C₆H₄-N=N-C₆H₄-N=N-[naphthol]-CONH-C₆H₃(CH₂N(CH₃)₃) (with OH groups) | bordo. |

Example 7

16.3 parts by weight of 2-cyano-4-nitro-1-aminobenzene are introduced below 20° C. into 120 parts by weight of nitrosylsulfuric acid corresponding to a content of 6.9 g. of sodium-nitrite. The solution is stirred until the amine completely dissolves. The solution of the diazo compound thus obtained is then poured on ice and the clear diazo salt solution combined with a water/methanol solution of 28 parts by weight of the chloride of 5-hydroxy-1-β-trimethyl-ammonium-ethyl-aminonaphthalin. After a short time, the dyestuff formation is complete. The solution is then neutralized to a pH 6 and combined with a solution of the diazo compound obtained from 19.6 parts by weight of 1-amino-2-trifluoro-methyl-4-chlorobenzene. The dyestuff thus formed precipitates. It is filtered with suction and dried. It dyes polyacrylonitrile fibre from weakly acid bath in bluish-green shades of good fastness properties.

Further dyestuffs having similar dyeing properties are obtained in an analogous manner if using the same coupling component and the first and second diazo compounds listed in the following table:

| First diazo compound | Coupling component | Second diazo compound | Shade of dyeing or print on polyacrylonitrile fabric |
|---|---|---|---|
| 1-Amino-2,4-dicyanobenzene | 5-hydroxy-1-(β-trimethylammonium-ethyl-amino)-naphthalene chloride | 1-Amino-2,4-dicyanobenzene | bluish grey. |
| 1-Amino-2-cyano-4-nitrobenzene | 5-hydroxy-1-(β-trimethylammonium-ethyl-amino)-naphthalene chloride | 1-Amino-2-cyano-4-nitrobenzene | greenish grey. |
| 1-Amino-2-cyano-5-chlorobenzene | 5-hydroxy-1-(β-trimethylammonium-ethyl-amino)-naphthalene chloride | 1-Amino-2-cyano-5-chlorobenzene | violet. |
| Do. | 5-hydroxy-1-(β-trimethylammonium-ethyl-amino)-naphthalene chloride | 1-Amino-2-cyano-4-nitrobenzene | Do. |
| 1-Amino-2-cyano-4-nitrobenzene | 5-hydroxy-1-(β-trimethylammonium-ethyl-amino)-naphthalene chloride | 1-Amino-2,4-dicyano-benzene | greenish blue. |

| First diazo compound | Coupling component | Second diazo compound | Shade of dyeing or print on polyacrylonitrile fabric |
|---|---|---|---|
| 1-Amino-2,4-dicyanobenzene | [naphthalene structure with HO– and –NH–CH₂–CH₂–N(CH₃)₃⁺ Cl⁻] | 1-Amino-2-cyano-4-nitrobenzene | reddish blue. |
| 1-Amino-2-chloro-4-nitrobenzene | [naphthalene structure with HO– and –NH–CH₂–CH₂–N(CH₃)₃⁺ Cl⁻] | 1-Amino-2-chloro-4-nitrobenzene | grey. |
| 1-Amino-2-cyano-4-nitrobenzene | [naphthalene structure with HO– and –NH–CH₂–CH₂–N(CH₃)₃⁺ Cl⁻] | ...do... | black-brown. |

*Example 8*

A fabric of polyacrylonitril is printed with a printing paste consisting of 30 g. of the dyestuff obtained from 2 mol of diazotized 1-amino-2-chloro-4-nitrobenzene and 1 mol of the chloride of 1-(β-trimethyl-ammonium-ethyl)-amino-5-hydroxynaphthalene 50 g. of thio-diglycol
30 g. cyclo hexanol
50 g. of 30 percent acetic acid
280 g. of water
30 g. of zinc nitrate (50 percent)
30 g. of printing oil, and
50 g. of resorcinol or another phenol The print is steamed at 100 to 103° C. for 10–30 minutes and then soaped at 40–60° C. and dried. A greenish-black print of good fastness properties is thus obtained.

What we claim is:

1. A disazo dyestuff corresponding to the formula

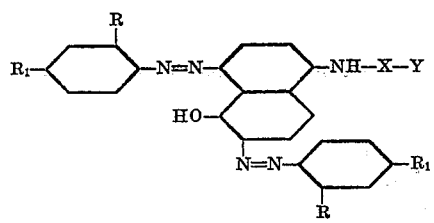

wherein R and R₁ stand for members selected from the group consisting of cyanogen and nitro, X means a lower alkylene bridging member, and Y stands for a tri-lower alkyl ammonium group.

2. The disazo dyestuff corresponding to the formula

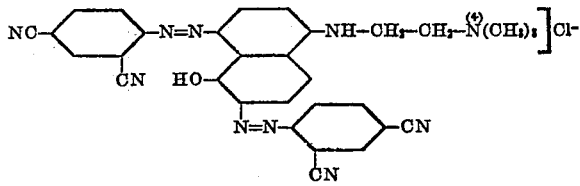

3. The disazo dyestuff corresponding to the formula

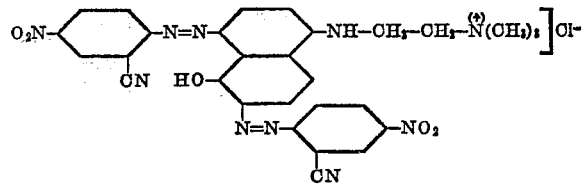

4. The disazo dyestuff corresponding to the formula

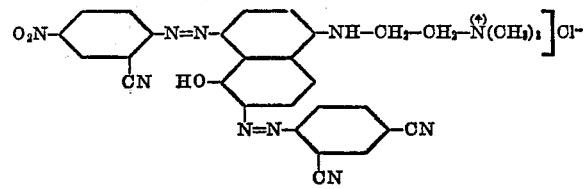

5. The disazo dyestuff corresponding to the formula

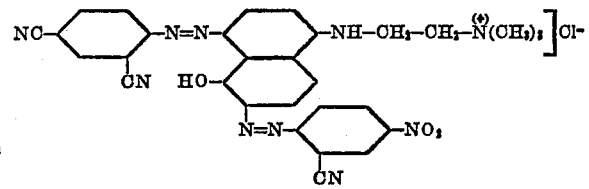

References Cited in the file of this patent
UNITED STATES PATENTS 2,099,525    Krzikalla et al. _____ Nov. 16, 1937